US009445060B2

(12) United States Patent
Li et al.

(10) Patent No.: US 9,445,060 B2
(45) Date of Patent: Sep. 13, 2016

(54) LAYERED LOCALLY CACHED CONTENT TRANSCODING SYSTEM

(71) Applicant: Broadcom Corporation, Irvine, CA (US)

(72) Inventors: Yong Li, San Diego, CA (US); Xuemin Chen, Rancho Santa Fe, CA (US)

(73) Assignee: Broadcom Corporation, Irvine, CA (US)

( * ) Notice: Subject to any disclaimer, the term of this patent is extended or adjusted under 35 U.S.C. 154(b) by 538 days.

(21) Appl. No.: 13/948,103

(22) Filed: Jul. 22, 2013

(65) Prior Publication Data
US 2015/0009403 A1 Jan. 8, 2015

Related U.S. Application Data

(60) Provisional application No. 61/842,923, filed on Jul. 3, 2013.

(51) Int. Cl.
H04N 7/01 (2006.01)
H04N 19/423 (2014.01)
H04N 19/40 (2014.01)
H04N 21/231 (2011.01)
H04N 21/2343 (2011.01)
H04N 21/643 (2011.01)

(52) U.S. Cl.
CPC .......... H04N 7/26707 (2013.01); H04N 19/40 (2014.11); H04N 21/2343 (2013.01); H04N 21/23106 (2013.01); H04N 21/64322 (2013.01)

(58) Field of Classification Search
CPC ........................................................ H04N 7/01
See application file for complete search history.

(56) References Cited

U.S. PATENT DOCUMENTS

| 2008/0046978 | A1* | 2/2008 | Rieger | H04L 41/12 726/4 |
| 2013/0332971 | A1* | 12/2013 | Fisher | H04N 21/266 725/93 |
| 2014/0215543 | A1* | 7/2014 | Li | H04N 21/64738 725/115 |
| 2014/0280679 | A1* | 9/2014 | Dey | H04L 67/2842 709/213 |
| 2015/0012707 | A1* | 1/2015 | Li | H04L 67/2885 711/122 |

* cited by examiner

Primary Examiner — James Pontius
(74) Attorney, Agent, or Firm — McDermott Will & Emery LLP

(57) ABSTRACT

A system for transcoding locally cached content may include a memory configured to store at least a video stream. A controller communicatively coupled to the memory may be configured to determine a video definition format of a requested video stream and compare the requested video stream with a video definition format of a cached version of the requested video stream. A transcoder coupled to the controller may be configured to convert the cached version of the requested video stream to a lower video definition format if the video definition format of the cached version is determined to be higher than the video definition format of the requested video stream. If the video definition format of the requested video stream is same as the video definition format of the cached version, the controller may supply the requested video stream using the cached version stored in the memory without transcoding.

20 Claims, 9 Drawing Sheets

LAYERED LOCALLY CACHED CONTENT TRANSCODING SYSTEM

CROSS-REFERENCE TO RELATED APPLICATIONS

The present application claims the benefit of U.S. Provisional Patent Application Ser. No. 61/842,923, titled "LAYERED LOCALLY CACHED CONTENT TRANSCODING SYSTEM," filed on Jul. 3, 2013, which is hereby incorporated by reference in its entirety for all purposes.

TECHNICAL FIELD

The present description relates generally to adaptive bit rate services, and more particularly, but not exclusively, to a transcoding system for adaptive bit rate services.

BACKGROUND

Adaptive Bit Rate (ABR) technology is emerging as a popular media technology to support Internet Protocol Television (IPTV) services for broadband users. An approach to provide broadband services to multi-dwelling unit (MDU) users is to extend a passive optical network connection to the boundary of a MDU and then distribute the broadband services over physical connections that are specific to the MDU in a broadcast nature. In this respect, IPTV services can be served on a subscriber data network that is configured in a tree topology, with the network rooted at a root node (e.g., at an optical line terminator (OLT)) and branching out to cable media converters (CMCs) via a passive optical distribution network, and further to gateways (GWs) that serve leaf devices such as set-top boxes and other operably-connected computing devices (e.g., personal computers and mobile devices) via a coax cable distribution network.

The CMCs and GWs can cache unique ABR video streams, including streams that carry the same video program but have different bit rates. However, this approach can pose significant inefficiencies across the optical and cable distribution networks if MDU users experience different bandwidth availability and have different video-processing capabilities.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced using one or more implementations. In one or more instances, structures and components are shown in block diagram form in order to avoid obscuring the concepts of the subject technology.

The subject disclosure provides a transcoding-enhanced network architecture, where ABR video segments that are cached locally at network nodes (e.g., CMCs, GWs) of one or more distribution networks (e.g., passive optical network, coax cable) can be transcoded on-the-fly depending on the bandwidth availability and/or video-processing capabilities of MDU users. By adaptively applying the video transcoding to the locally-cached ABR video segments, a decrease in cache size and an increase in bandwidth efficiency can be realized.

In some implementations, a system for transcoding locally cached content may include a memory configured to store at least a video stream. A controller communicatively coupled to the memory may be configured to determine a video definition format of a requested video stream and compare the requested video stream with a video definition format of a cached version of the requested video stream. A transcoder coupled to the controller may be configured to convert the cached version of the requested video stream to a lower video definition format if the video definition format of the cached version is determined to be higher than the video definition format of the requested video stream. If the video definition format of the requested video stream is same as the video definition format of the cached version, the controller may supply the requested video stream using the cached version stored in the memory without transcoding.

Figure 1:
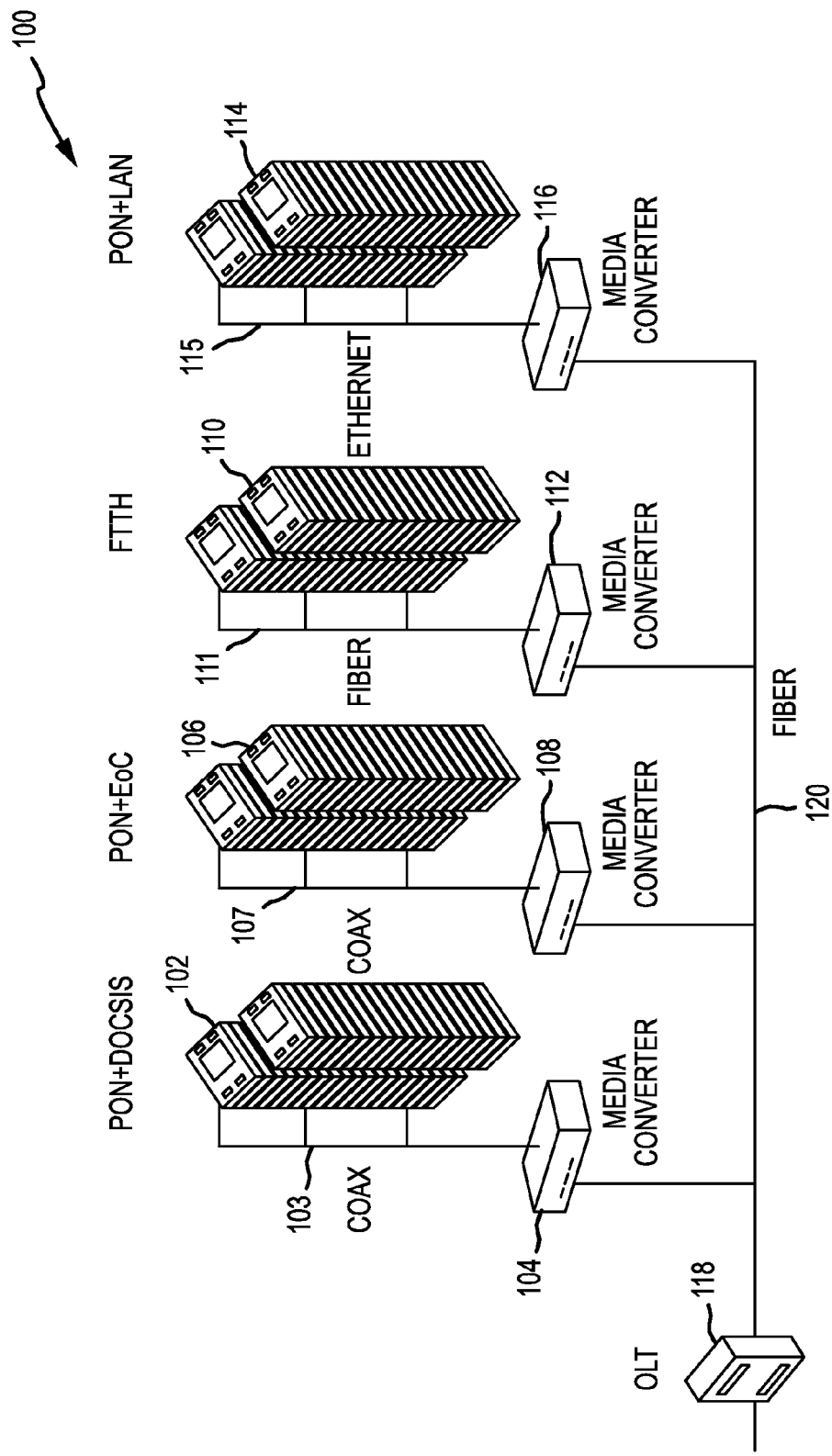
FIG. 1 illustrates an example multi-dwelling unit environment in which transcoding of adaptive bit rate services may be implemented in accordance with one or more implementations.

FIG. 1 illustrates an example multi-dwelling unit (MDU) environment 100 in which adaptive bit rate services may be implemented in accordance with one or more implementations. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

As shown in FIG. 1, each multi-dwelling unit (MDU) environment has its own physical wiring and corresponding broadband distribution technology within the building. The example MDU environment 100 includes buildings 102, 106, 110 and 114, which may be multi-dwelling units (MDUs), houses, offices, or any generally structures. In one or more implementations, one or more of the buildings 102, 106, 110, 114 may represent a collection of separate structures, such as a subdivision of separate houses.

The access data networks for many countries have been designed to fit the MDU environment 100, for example. In countries such as China, most residential broadband users live in the MDU environment 100. Even in the rest of countries (such as the United States of America), the MDU broadband users also represent an important segment of the market. An emerging approach of providing broadband services to the MDU users is to extend xPON (EPON or GPON) connection to the boundary of a MDU and then distribute the services over physical connections that are specific to the MDU environment 100. Such connections may include, but not limited to, Coax, Ethernet, and fiber. A central element in supporting this approach is a media converter that performs the necessary conversion between the xPON media and the MDU-specific media.

By way of illustration, the example MDU environment 100 includes building 102 communicatively coupled to media converter 104 via a coax transmission line 103. As such, the broadband distribution technology to building 102 includes a fiber to coax interconnection to support a PON+DOCSIS architecture. The example MDU environment 100 also includes building 106 communicatively coupled to media converter 108 via a coax transmission line 107. The broadband distribution technology to building 106 includes a fiber to coax interconnection to support a PON+Ethernet-over-Coax (EoC) architecture. The example MDU environment 100 also includes building 110 communicatively coupled to media converter 112 via an optical transmission line 111 (or fiber optic transmission line). The broadband distribution technology to building 110 includes a fiber-to-fiber interconnection to support a fiber-to-the-home (FTTH) architecture. The example MDU environment 100 further includes building 114 communicatively coupled to media converter 116 via an Ethernet transmission line 115. The broadband distribution technology to building 114 includes a fiber to Ethernet interconnection to support a PON+local area network (LAN) architecture.

There are two distinct characteristics of these networks: a) they have tree topology, where the network is rooted at a central optical device 118 (e.g. OLT) and branched out in multiple layers to reach leaf devices (e.g. STBs, tablets, PCs) in customer homes; b) they serve a user population of high density. A typical example is a network with the China-DOCSIS (C-DOCSIS) system, where the xPON is extended from the central optical device 118 (or OLT) to a set of CMC's (coax media converters) via fiber transmission line 120 that in turn serve users within various buildings via the coax distribution network.

By way of example, the C-DOCSIS system is optimized to provide multicast-based TV services (e.g. via IP multicast). In this case, even when all users tune to the same channel, only a single copy of the program is carried on any given branch of the network tree. However, these networks pose a serious challenge for unicast-based services such as ABR (adaptive bit rate). If all users tune to the same channel, each branch of the network tree would have to carry an aggregated N copies of the same program, where N is the number of users connected to the branch (probably across more than one layer).

Figure 2:
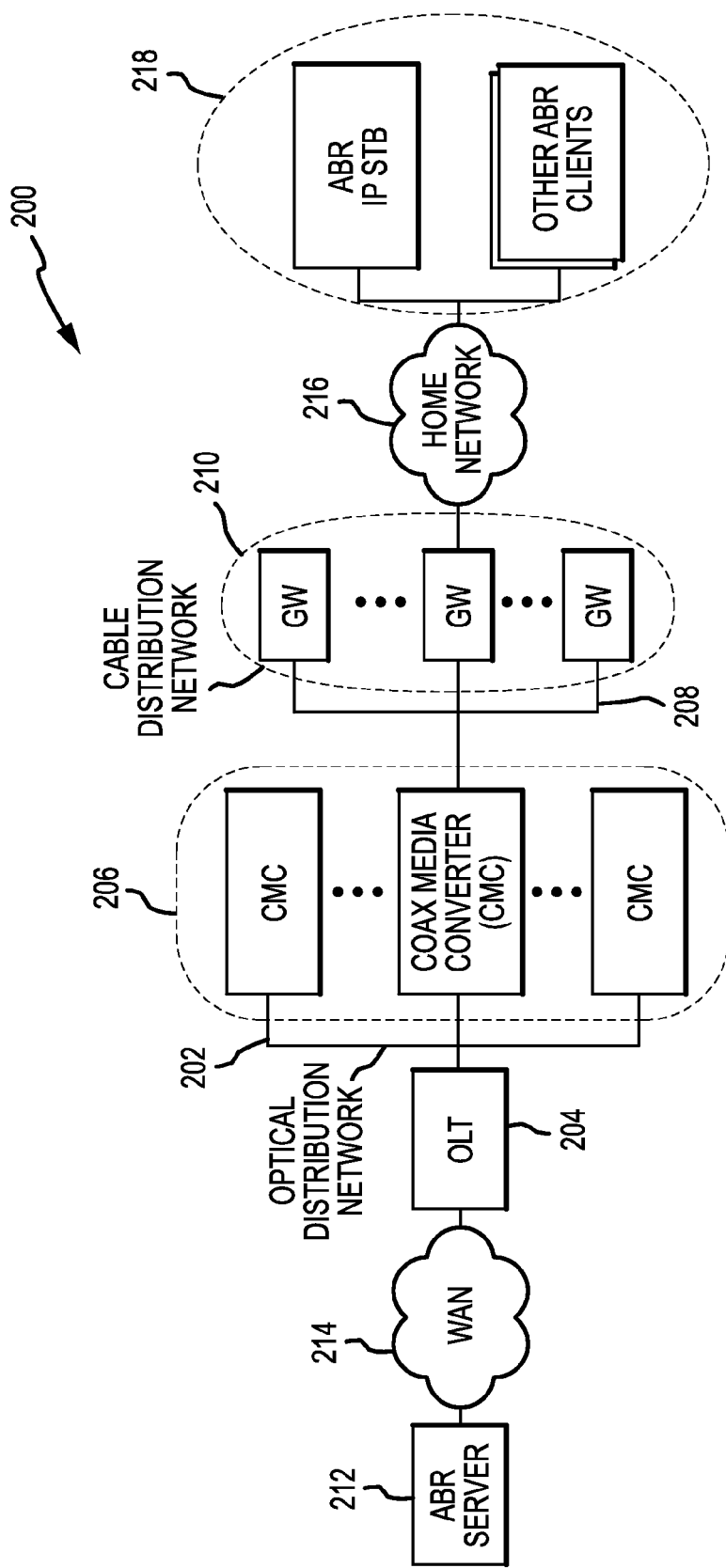
FIG. 2 illustrates an example network environment in which transcoding of adaptive bit rate services may be implemented in accordance with one or more implementations.

FIG. 2 illustrates an example network environment 200 in which adaptive bit rate services may be implemented in accordance with one or more implementations. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

As shown in FIG. 2, the example network environment 200 includes an optical distribution network 202, optical line terminator 204, coax media converter network 206, cable distribution network 208, gateway network 210, adaptive bit rate server 212, wide area network 214, home network 216 and adaptive bit rate clients 218. The example network environment 200 represents a C-DOCSIS network that may be based on the "PON+DOCSIS" architecture. In the example network environment 200, the optical distribution network 202 extends the PON (e.g. EPON) services from the centralized OLT 204 to multiple coax media converters (CMCs) (or coax media converter network 206) located within their served MDUs.

As population densities increase in urban areas, broadband service providers are moving fiber optic network endpoints closer to buildings (or areas) that are associated with high population densities, such as into the basements of multi-dwelling units (MDUs). For example, a broadband service provider may place fiber optic network endpoints, e.g. optical network terminals (ONTs), in the basements of large high-rise apartment buildings that include several apartments. The broadband service provider's headend may include the optical line terminal (OLT) 204 that is communicatively coupled to the ONTs, e.g. via fiber optic cables. The ONTs may be individually coupled, via a non-optical medium, such as a coaxial transmission line, to gateway devices 210 that are located in, and provide broadband service (e.g. television, telephone, and/or Internet) to, user devices 218 in the individual dwelling units. Thus, the ONTs may each include, and/or may be coupled to, a media converter 206 that converts optical signals received over the optical distribution network 202 from the OLT 204 of the headend to electric signals that can be transmitted over the non-optical network medium 208 (e.g., cable distribution network) to the gateway devices 210 in the individual dwelling units, and vice-versa.

The user devices 218 can be computing devices such as laptop or desktop computers, smartphones, personal digital assistants ("PDAs"), portable media players, set-top boxes, tablet computers, televisions or other displays with one or more processors coupled thereto and/or embedded therein, or other appropriate computing devices that can be used for adaptive bit rate streaming, and rendering, of multimedia content and/or can be coupled to such a device.

The CMC 206 may be responsible for performing the transport and protocol conversions between the PON and the C-DOCSIS. The C-DOCSIS services are provided to individual users (e.g., user devices 218) via the CMC 206 on the terminal side and the gateway 210 with embedded cable modem on the user side. The GW 210 provides broadband accesses to various IP devices (e.g., user devices 218) in the home via the home network 216. The relevant IP devices include ABR-based IP STBs and other ABR clients such as tablets and smart phones. FIG. 2 illustrates how the ABR service is offered over the C-DOCSIS network.

Two characteristics of the C-DOCSIS network shown in FIG. 2 may be the following: (a) all the packets that are transmitted by the OLT 204 on the PON fiber link (e.g., optical distribution network 202) will reach all CMC's 206 that are on the same link (probably after multiple stages of optical splitters). In this regard, the PON fiber link downstream is a broadcast media by nature. That is, a CMC may be able to "see" all downstream packets regardless of whether the packets target the same CMC or any other CMC's communicatively coupled to the same downstream channel; (b) all the packets that are transmitted by a CMC on the coax cable link (e.g., cable distribution network 208) will reach all GW's 210 that are on the same coax link (probably after multiple stages of RF amplifiers/taps/splitters). In this regard, the coax cable link downstream is a broadcast media by nature. That is, a GW may be configured to "see" all downstream packets regardless of whether these packets target the same GW or any other GW's on the same downstream channel.

ABR is emerging as the popular technology to support IPTV services for broadband users. However, since ABR utilizes IP unicast, ABR poses serious a bandwidth-requirement challenge in a high-user-density MDU environment. The hierarchical network arrangement of the ONTs/media converters 206, gateway devices 210, and user devices 218 may be beneficial for broadcast transmissions from the headend (e.g., ABR server 212) to the user devices 218, e.g. a single transmission that is being transmitted from the headend to multiple user devices. However, the hierarchical network arrangement may result in network congestion when multiple simultaneous unicast transmissions are being transmitted from the headend to the user devices 218, e.g. when the user devices 218 are simultaneously accessing adaptive bit rate (ABR) streaming content from the headend.

Figure 3:
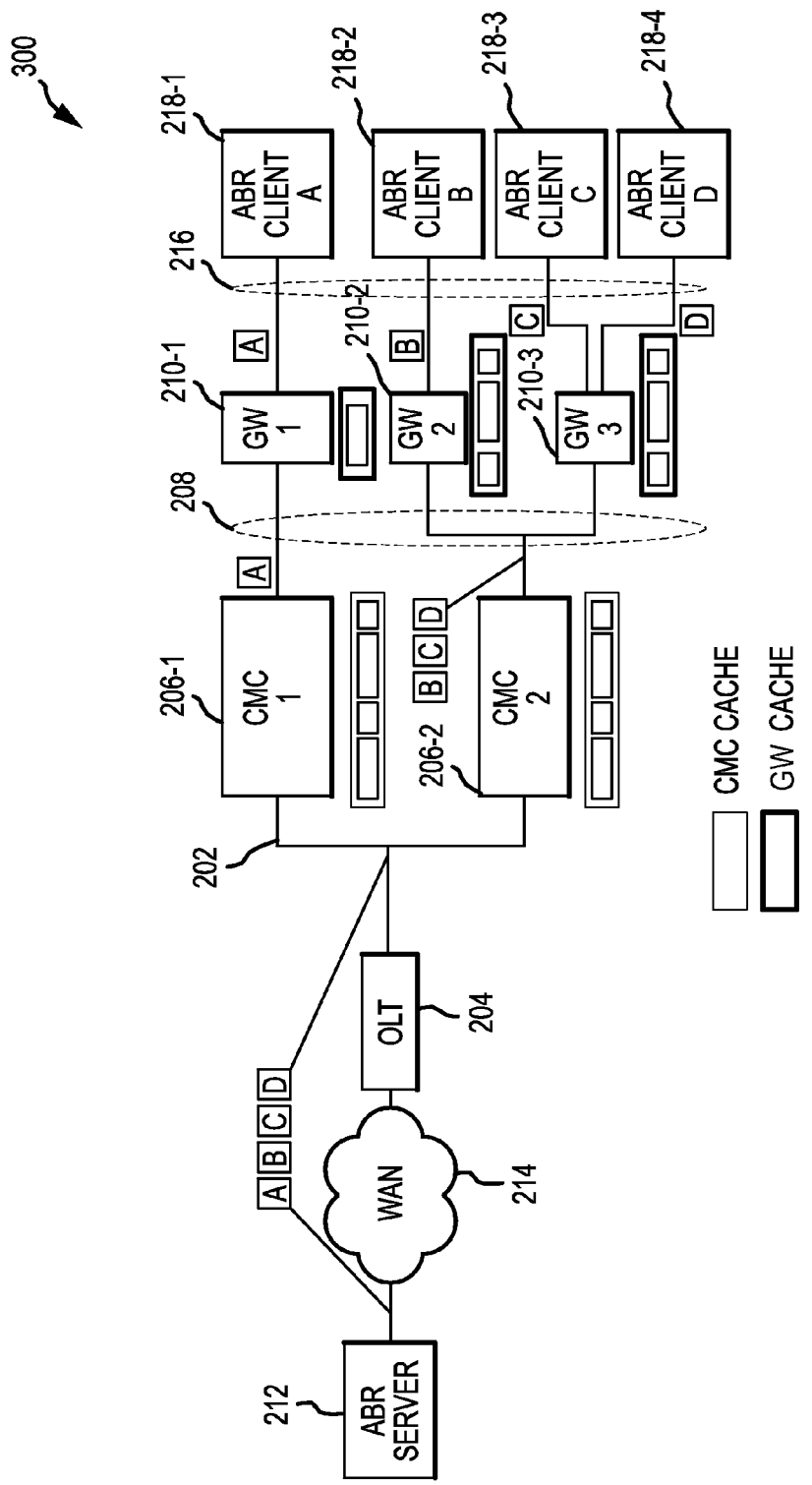
FIG. 3 illustrates an example network environment in which local caching with multiple bit rates for adaptive bit rate services may be implemented in accordance with one or more implementations.

FIG. 3 illustrates an example network environment 300 in which local caching with multiple bit rates for adaptive bit rate services may be implemented in accordance with one or more implementations. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

The example network environment 200 includes an optical distribution network 202, optical line terminator 204, coax media converter devices 206-1, 206-2, cable distribution network 208, gateway devices 210-1, 210-2, 210-3, adaptive bit rate server 212, wide area network 214, home network 216 and adaptive bit rate clients 218-1, 218-2, 218-3, 218-4.

As shown in FIG. 3, the coax media converter devices 206-1, 206-2 and the gateway devices 210-1, 210-2, 210-3 cache all unique ABR streams, including the streams that carry the same video program but have different bit rates. The packets as shown in FIG. 3 are depicted as having different patterns to represent different programs and the length of a patterned block represents the bit rate of the video segment. This can be inefficient if the client population (e.g., adaptive bit rate clients 218-1, 218-2, 218-3, 218-4) experiences different bandwidth availability and has different video-processing capabilities (thus will request video segments with different bit rates).

Figure 4:
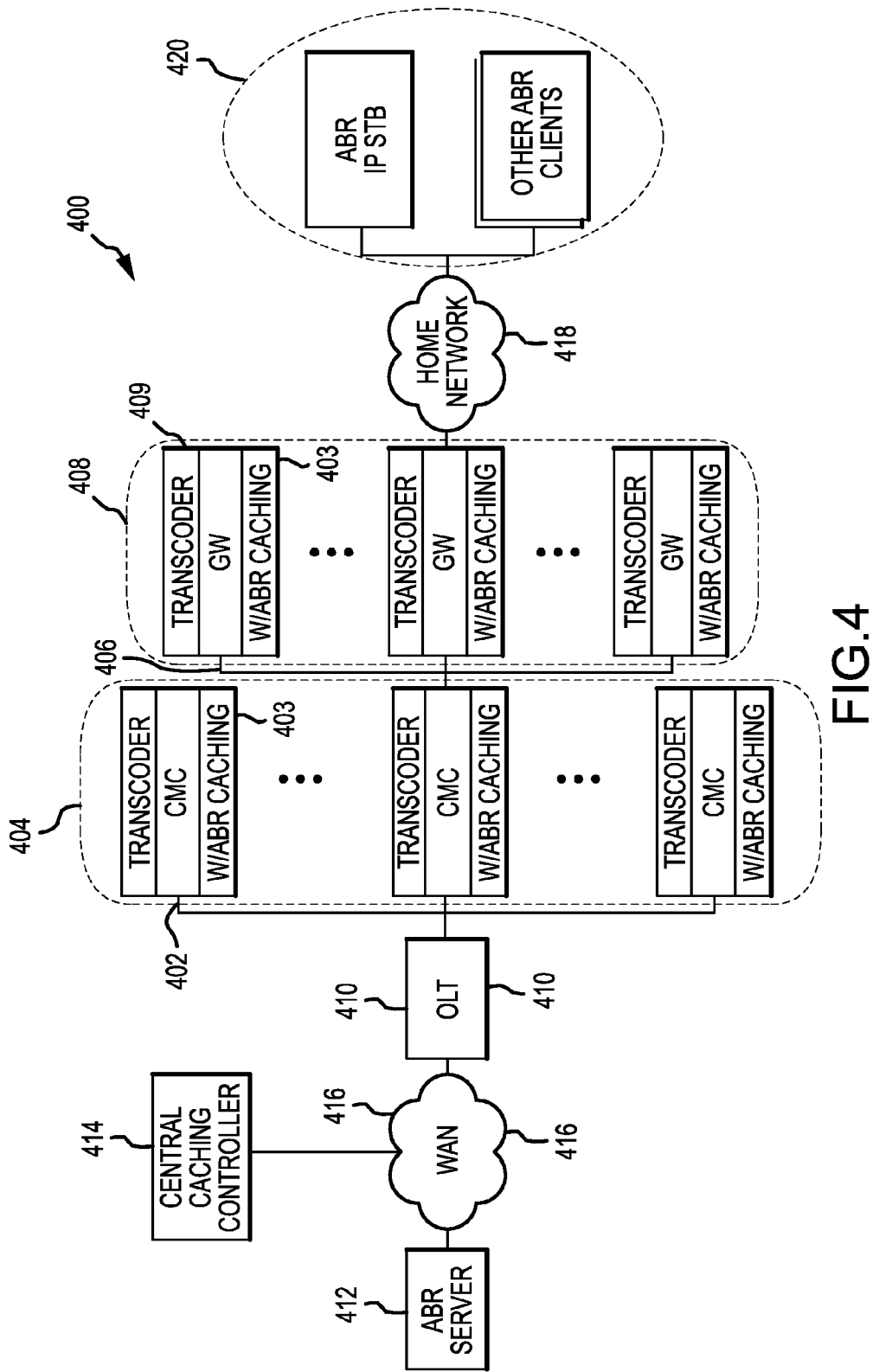
FIG. 4 illustrates an example network environment in which a transcoding system for adaptive bit rate services may be implemented in accordance with one or more implementations.

FIG. 4 illustrates an example network environment 400 in which a transcoding system for adaptive bit rate services may be implemented in accordance with one or more implementations. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

The subject disclosure provides enhancements that consist of adding a set of transcoders to the CMC and the GW and adaptively applying the video transcoding to minimize the cache size and increase bandwidth efficiency. The example network environment 400 includes CMC's 404 and GW's 408 that support ABR layered local caching and a central caching controller 414 that coordinates the overall caching operations, as shown in FIG. 4. The example network environment 400 also includes optical distribution network 402, cable distribution network 406, optical line terminator 410, adaptive bit rate server 412, wide area network 416, home network 418 and adaptive bit rate clients 420.

In some aspects, the example network environment 400 includes a first network node (sometimes referred to as the coax media converters 404) on a first distribution network (sometimes referred to as the optical distribution network 402) having a first caching controller 403 and a first transcoder 405. The example network environment 400 also includes a second network node (sometimes referred to as the gateway devices 408) on a second distribution network (sometimes referred to as the cable distribution network 406) having a second caching controller 407 and a second transcoder 409, and communicatively coupled to the first network node.

The example network environment 400 includes the central caching controller 414 that is communicatively coupled to the first network node and configured to control the first caching controller of the first network node. In some aspects, the first caching controller may be configured to control the second caching controller. In one or more implementations, the first network node is configured to store a video segment transmitted on the first distribution network based on a first instruction received by the first caching controller from the central caching controller 414. In some implementations, the second network node is configured to store a video segment transmitted on the second distribution network based on a second instruction received by the second caching controller from the first caching controller.

The ABR server 412 may be configured to identify the streams that include the same content item and transmit streams to the WAN 416. The ABR server 412 may determine the encoding parameters of the respective streams, identify the segments of the streams, and generate a manifest file that lists the encoding parameters and the available segments. The ABR server 412 may transmit the manifest file to the user devices 218 via the optical and cable distribution networks 402 and 406, respectively, and may provide requested segments to the user devices 218 via the optical and cable distribution networks 402 and 406, respectively.

Each of the CMC's 404 and GW's 408 includes a transcoder that is configured to transcode one or more received streams, e.g. to generate additional versions of a content item, such as at bit rates that may be desirable for one or more of the user devices 420. The transcoder may be configured to receive a video stream in a first video definition format, decode the received video stream, and re-encode the video stream into a lower or a higher video definition format depending on the capabilities and/or bandwidth requirements of the user devices 420.

Upon receiving an ABR request for ABR video content from a downstream client (e.g., one or more of user devices 420), a network node (e.g., CMC's 404, GW's 408) determines if the requested ABR video content is associated with content already locally cached. If the requested ABR video content is already cached locally by the network node, the network node then determines if the requested ABR video content has a video definition format that is higher than a video definition format of the locally cached version of the requested ABR video content. If the requested ABR video content has a higher video definition format, then the network node forwards the request to an upstream network node (e.g., ABR server 412 if one of CMC's 404 is handling the ABR request) for the requested ABR video content. However, the request may not be forwarded if one of the following conditions is used to qualify the forwarding: a) the local storage space is constrained, b) the channel bandwidth is limited, or c) the requested program has low priority or importance. Under such conditions, the response to the ABR request can be generated from the local copy without being streamed from the higher-level cache (e.g., cache of one of the CMC's 404) or the ABR Server 412.

In the alternative, if the requested ABR video content has a lower video definition format, then the network node can supply a response with the requested ABR video content in the requested video definition format by applying video transcoding on the locally cached version of the requested ABR video content. By way of example, the requested ABR video content may have a 720p high-definition (HD) format, where the locally cached version has a 1080p HD format. In this respect, the locally cached version can be transcoded into the requested 720p HD format and supplied to the requesting client (e.g., one of user devices 420) via an ABR response.

Upon receiving an ABR response from an upstream network node (e.g., one of CMC's 404), a network node (e.g., one of GW's 408) forwards the ABR response to a requesting downstream client (e.g., one of user devices 420) and at the same time determines if the received ABR response including previously requested ABR video content is already cached locally. If a locally cached version already exists, the network node (e.g., GW 408) determines if a video definition format of the received ABR video content is higher than a video definition format of the locally cached version. If the received ABR video content has a higher video definition format, then the locally cached version is replaced with the transcoded ABR video content. This ensures that the locally cached version has the highest video definition format available.

Figure 5:
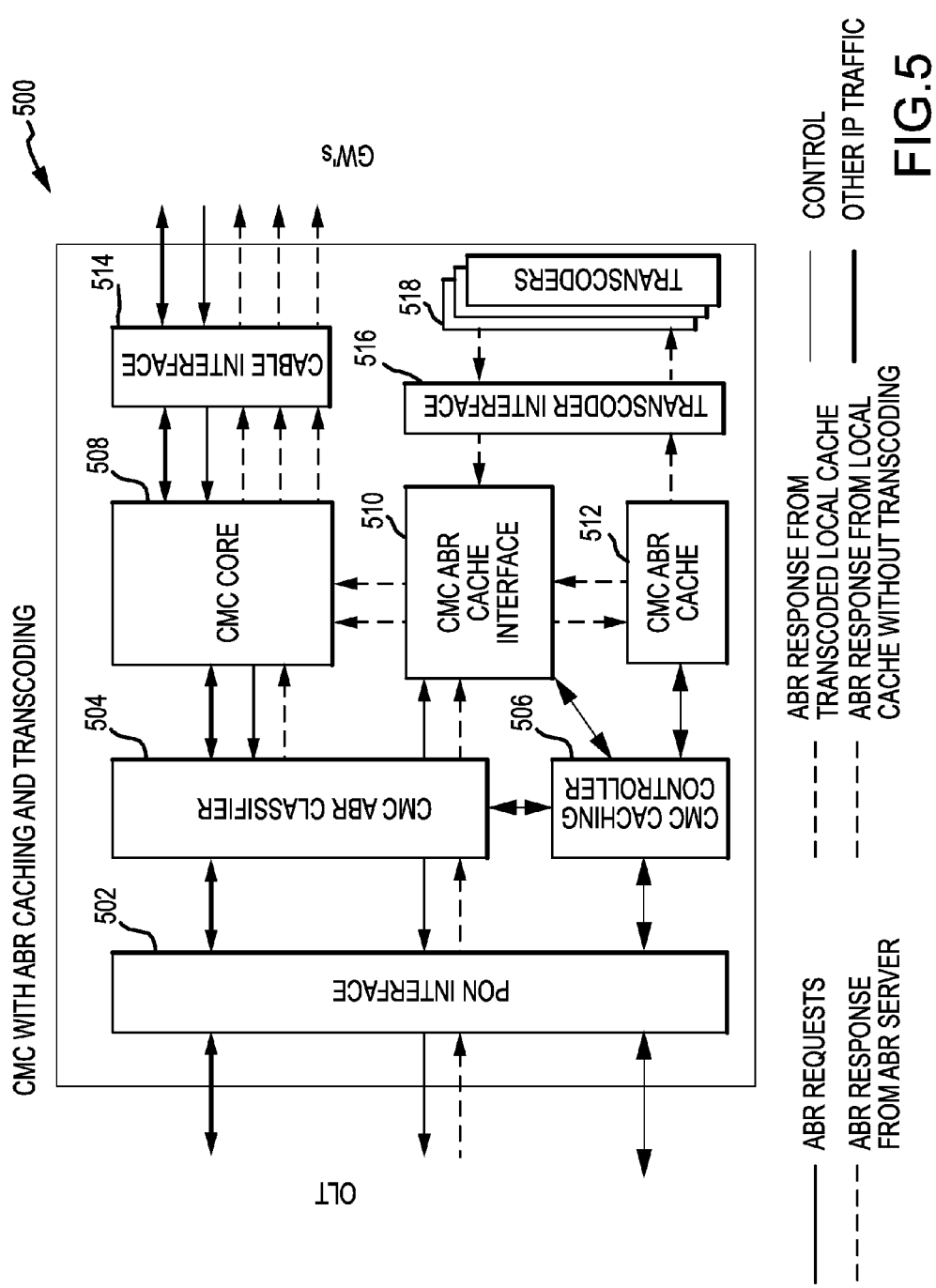
FIG. 5 illustrates an example media converter device that may be used in a transcoding system for adaptive bit rate services in accordance with one or more implementations.

FIG. 5 illustrates an example media converter device 500 that may be used in a transcoding system for adaptive bit rate services in accordance with one or more implementations. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

The example media converter device 500 includes a passive optical network (PON) interface 502, a coax media converter (CMC) adaptive bit rate (ABR) classifier 504, a CMC caching controller 506, a CMC core 508, a CMC ABR cache interface 510, a CMC ABR cache 512 and a cable interface 514.

In some aspects, the PON interface 502 may communicatively couple the media converter device 500 to the OLT 510 via the optical distribution network 502. The media converter device 500 may receive IP streams, such as unicast and/or multicast streams, from the ABR server 212 via the PON interface 502.

In the ABR-enhanced mode, the PON interface 502 may be set to a promiscuous mode, whereby all packets transmitted on a downstream optical channel via the optical distribution network 502 are received and sent to the CMC ABR classifier 504, regardless of whether the received packets are destined to the media converter device 500 or any other CMC on the same downstream channel. Receipt of all the packets allows the media converter device 500 to "see" all ABR-related HTTP responses from the ABR Server 412. These responses may include video segments corresponding to the channels watched by all users on a given optical downstream channel. For example, in a MDU community, if each MDU building is served by one CMC and all CMC's serving the community are on the same optical downstream channel, then each CMC will be able to intercept all video segments associated with the IPTV video channels watched by the entire user population in the community.

The CMC ABR classifier 504 is configured to classify the received packets by the PON interface 502 and separates them into the following 3 types:

For ABR responses from the ABR server 412:

The CMC ABR classifier 504 is configured to forward the response packets to the CMC ABR cache interface 510.

The CMC ABR classifier 504 is configured to duplicate the response packets and forward them to the CMC core 508, if the response packets are destined to the ARB clients behind the media converter device 500 (e.g., clients located downstream on the same downstream channel).

For non-ABR-response packets destined to the media converter device 500:

The CMC ABR classifier 504 is configured to forward the non-ABR-response packets directly to the CMC core 508.

For other packets:

The CMC ABR classifier 504 is configured to discard the other packets, since they are non-ABR-responses packets destined to other CMC's (e.g., other than the media converter 500).

The CMC ABR cache interface 510 is configured to perform the caching of the received video segments contained in ABR responses from the ABR server 412. In some aspects, the caching can be done per IPTV channel. The information about the channel lineup and their mapping to HTTP video segments URL addresses may be configured by a user operator via the CMC caching controller 506. The CMC ABR cache interface 510 can also monitor the storage availability of the CMC ABR cache 512. When the storage is about to be fully used, the CMC ABR cache interface 510 can discard the ABR responses received from the CMC ABR classifier 504 to the CMC core 508, without caching the corresponding video segments.

The CMC ABR cache 512 is a storage module (or memory) for cached video segments. The CMC ABR cache 512 may be configured to buffer, or store, one or more received streams and/or one or more segments of received streams, e.g. for transmission to the user devices 218. The CMC ABR cache 512 may also store associations between segments of streams and time stamps and/or markers.

The CMC core 508 may represent the rest of the main CMC functions needed by the C-DOCSIS architecture. In particular, the CMC core 508 may be responsible for forwarding of packets that have been cached by the CMC ABR cache interface 510 to the cable interface 514.

The cable interface 514 may represent a radio frequency (RF) interface of the media converter device 500 in the C-DOCSIS architecture. The cable interface 514 may communicatively couple the media converter device 500 to the user devices 218 via the cable distribution network 406.

The cable interface 514 may be configured to receive packets, including ABR requests, from all GW's connected with the media converter device 500. Cable interface 514 may also forward any locally cached ABR responses to ABR clients located downstream from the media converter 500 on the same cable downstream channel.

The CMC core 508 may forward ABR requests from the ABR clients to the CMC ABR classifier 504. The CMC core 508 may also forward the locally cached ABR responses to the cable interface 514.

The CMC ABR classifier 504 may classify all received packets from the CMC core 508. The CMC ABR classifier 504 may also forward ABR requests that target locally cached video segments to the CMC ABR cache interface 510. In addition, the CMC ABR classifier 504 may forward any other packets (including ABR requests for non-cached video segments) to the passive optical network interface 502.

Based on the received ABR requests from the CMC ABR classifier 504, the CMC ABR cache interface 510 may retrieve the requested video segments form the CMC ABR cache 512, construct appropriate ABR responses, and forward the constructed ABR responses to the CMC core 508 including the retrieved video segments. The CMC ABR cache may send the requested video segments to the CMC ABR cache interface 510 upon request. The PON interface 502 may send all packets received from the CMC ABR classifier 504 on an optical upstream channel.

The transcoders 518 may be configured to receive one or more video packets to convert from one video definition format to another video definition format. In one or more implementations, such transcoding involves decoding the received video packets having a particular video definition format and then re-encoding the decoded video packets into encoded packets having a lower video definition format corresponding to the requesting downstream client. The transcoders 518 can communicate with the CMC ABR cache interface 510 and the CMC ABR cache 512 via the transcoder interface 516. In some aspects, the transcoders 518 are controlled with the transcoder interface 516, in coordination with the CMC ABR cache interface 510.

Figure 6:
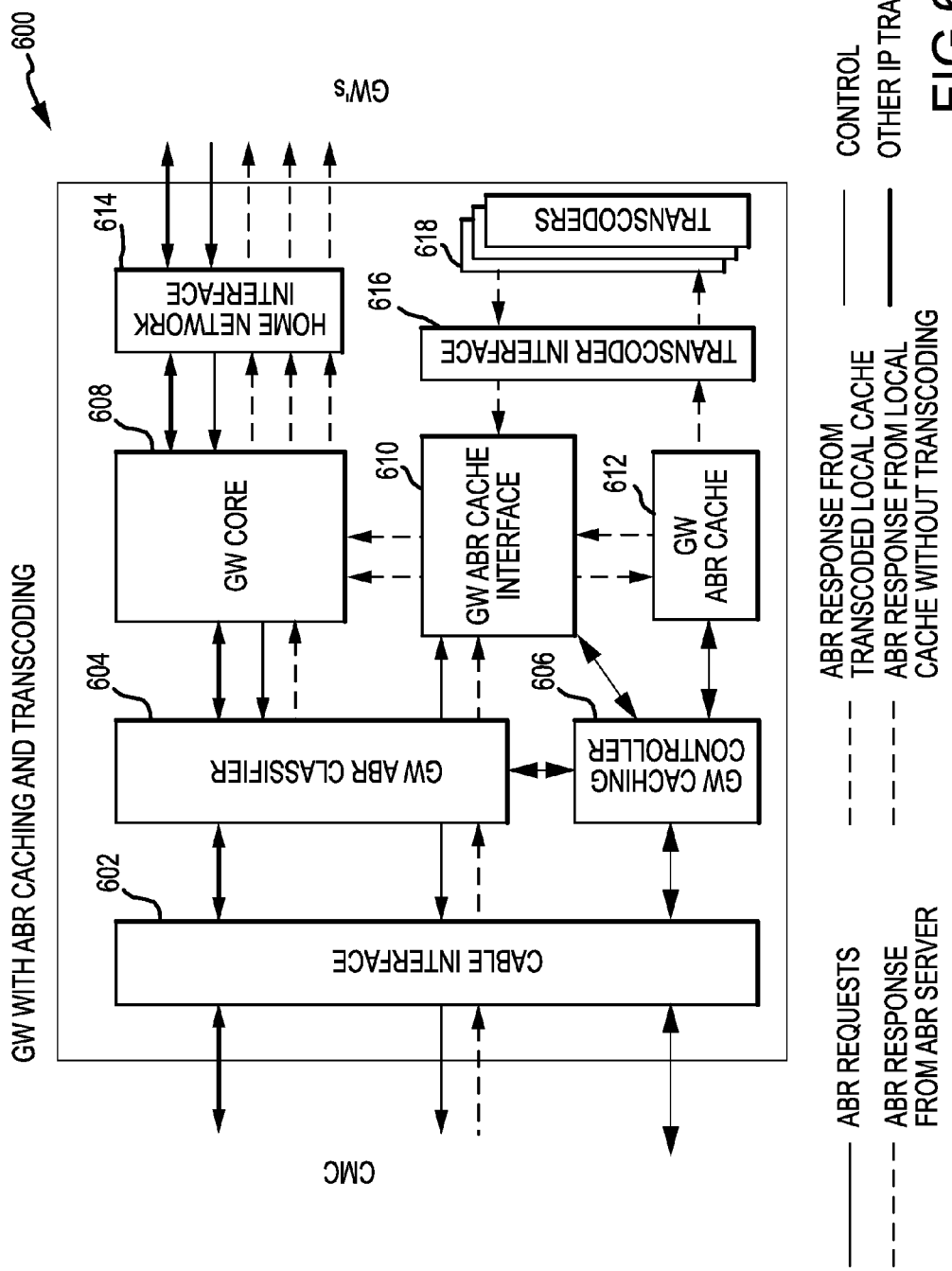
FIG. 6 illustrates an example gateway device that may be used in a transcoding system for adaptive bit rate services in accordance with one or more implementations.

FIG. 6 illustrates an example gateway device 600 that may be used in a transcoding system for adaptive bit rate services in accordance with one or more implementations. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

In terms of the support for ABR, the operations of the ABR-enhanced GW are similar to those of the ABR-enhanced CMC shown in FIG. 5. The only differences are: a) the network interfaces are now the cable interface (WAN-facing) and the home network interface (LAN-facing), rather than the passive optical network interface and the cable interface, respectively; b) the local caching is now performed for all ABR clients connected to a single CMC downstream channel, rather than for all CMCs connected to a single optical downstream channel.

During the initialization (e.g. power on or reset) of a CMC (e.g., media converter device 500), the CMC caching controller 506 may be configured to contact the central caching controller 414 to obtain a configuration file that contains at least the following information:

A set of programs to be cached. The set of programs represent the content that has common interest among the users served by the CMC. For example, these users belong to the same MDU community.

A set of programs to be cached in the GW's connected to the CMC. The set of programs represent the content that will likely be viewed on multiple clients connected to the GW. The information may be sent to the GW when the GW is initialized.

An aging value for each cached program. The caching may expire after an aging period and the cached program may be removed from the CMC ABR cache 512. For example, daily news programs can be assigned a lower aging value than newly released movies. As such, the daily news programs may be removed from storage sooner than the newly released movies.

A set of programs to be transcoded. The set of programs represent the content that would need to be converted into a lower video definition format based on the bandwidth requirements and/or video capabilities of the requesting downstream client. For example, the programs may only be presented in 720p HD format rather than 1080p HD format (which may be the version locally cached in the CMC ABR cache 512 or the ABR server 412).

During the initialization (e.g. power on or reset) of a GW (e.g., gateway device 600), the GW caching controller 606 may contact the CMC caching controller 506 to obtain a configuration file that contains at least the GW-specific information mentioned above. In addition, the configuration file can also contain the information that is added by the CMC caching controller 506. For example, such information can represent the CMC's own view about what programs may be viewed multiple times or viewed by multiple clients for a given GW, and thus should be cached on the gateway device 600.

During the normal operation of gateway device 600, the GW caching controller 606 may periodically report of caching operations (e.g. cached programs and cache usage) to the CMC caching controller 506. The latter in turn reports caching operations performed by the CMC caching controller 506 to the central caching controller 414. Based on the reported operational data, the higher-level controller (e.g., central caching controller 414 or CMC caching controller 506) can dynamically modify the configuration file of the lower-level controller (e.g., CMC caching controller 506 or GW caching controller 606). The modified configuration file can change the lower-level controller's caching behavior accordingly.

Besides receiving autonomous reports from the lower-level controllers (e.g., GW caching controller 606), the higher-level controller (e.g., CMC caching controller 506) can contact and send modified configuration files to the lower-level controllers at any appropriate time. The modified configuration files are useful to obtain operational status of all of lower-level controllers communicatively coupled to the higher-level controller.

For a received video segment (ABR response), the CMC and GW caching controllers 506 and 606 can check the program information of the video segment against program information contained in the configuration file. As such, the CMC and GW caching controllers 506 and 606 may allow the caching if and only if a match is established. The CMC and GW caching controllers 506 and 606 may remove a cached program if the cached program is aged according to the aging value in the configuration file.

Figure 7:
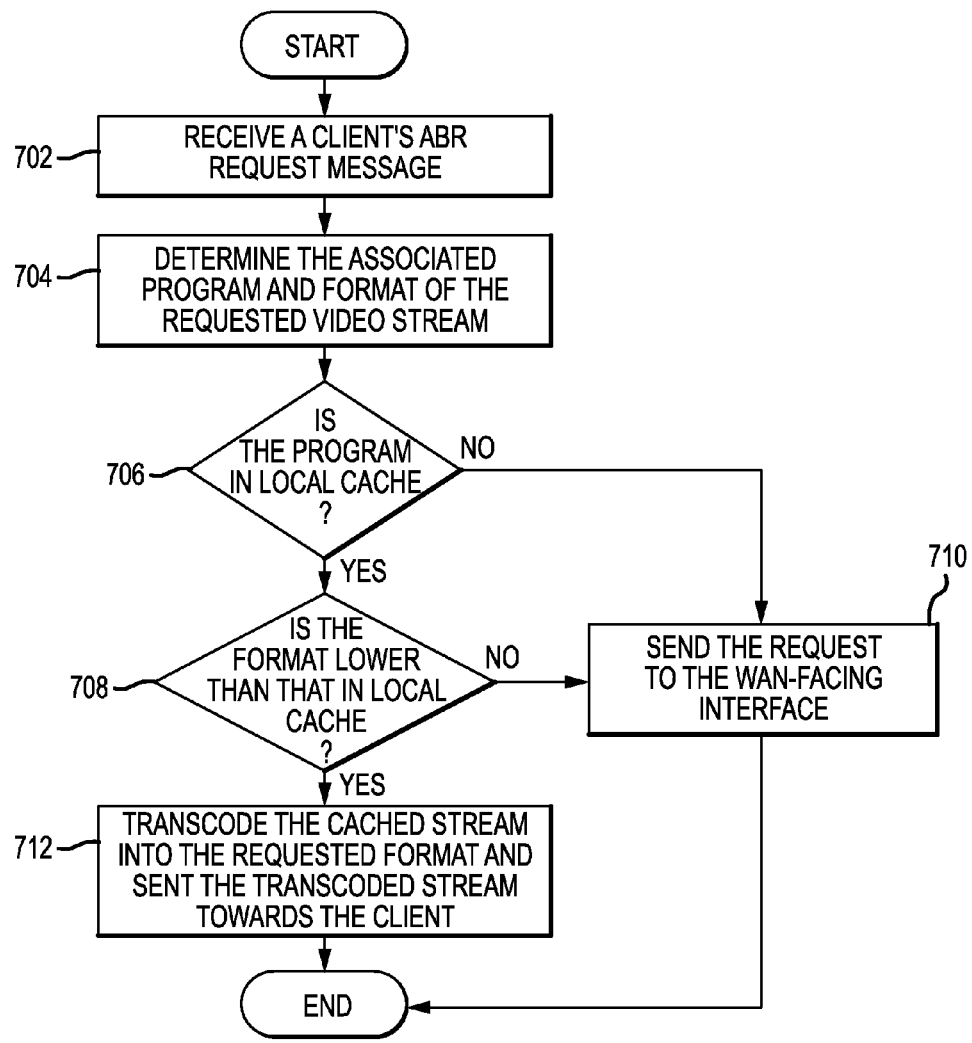
FIG. 7 illustrates a flow diagram of an example process of a layered local cache transcoding system for adaptive bit rate services in accordance with one or more implementations.

FIG. 7 illustrates a flow diagram of an example process 700 of a layered local cache transcoding system for adaptive bit rate services in accordance with one or more implementations. For explanatory purposes, the blocks of the example process 700 are described herein as occurring in serial, or linearly. However, multiple blocks of the example process 700 may occur in parallel. In addition, the blocks of the example process 700 need not be performed in the order shown and/or one or more of the blocks of the example process 700 need not be performed.

Upon receiving an ABR request from a client (702), an ABR classifier (e.g., CMC ABR classifier 504, GW ABR classifier 604) determines the associated program and video definition format of the requested video stream (704). The ABR classifier determines whether the requested video stream is associated with a program that has already been locally cached in the ABR cache (e.g., CMC ABR cache 512, GW ABR cache 612) (706). If no, the request is directly forwarded to the WAN-facing interface, in order to trigger the streaming of requested program from the higher-level cache (e.g., CMC ABR cache 512) or the central ABR server 412 (710).

Otherwise, the ABR Classifier determines whether the requested stream has a video definition format that is higher than a stream of the same program that has already been cached locally (708). If yes, the request is forwarded to the WAN-facing interface, in order to trigger the streaming of requested program from the higher-level cache or the central ABR server 412 (710). In this case, the locally cached copy of the program is not appropriate to be used to generate the requested profile without lowering the user's quality-of-experience, since it has a lower profile than the requested profile.

If requested stream does not have a video definition format that is higher than a stream of the same program that has already been cached locally, the request is forwarded to the ABR cache interface (e.g., CMC ABR cache interface 510, GW ABR cache interface 610). The ABR cache interface then determines if the requested video stream needs to be generated via transcoding from an existing stream in the local cache. If yes, the ABR cache interface can coordinate with the local cache (e.g., CMC ABR cache 512, GW ABR cache 612) and the transcoder interface (e.g., CMC transcoder interface 516, GW transcoder interface 616) to generate the requested stream and send the transcoded stream back to the requesting client in the form of ABR response packets (712). If no (the requested stream is directly available locally), the requested stream is sent back to the client in the form of ABR responses.

Figure 8:
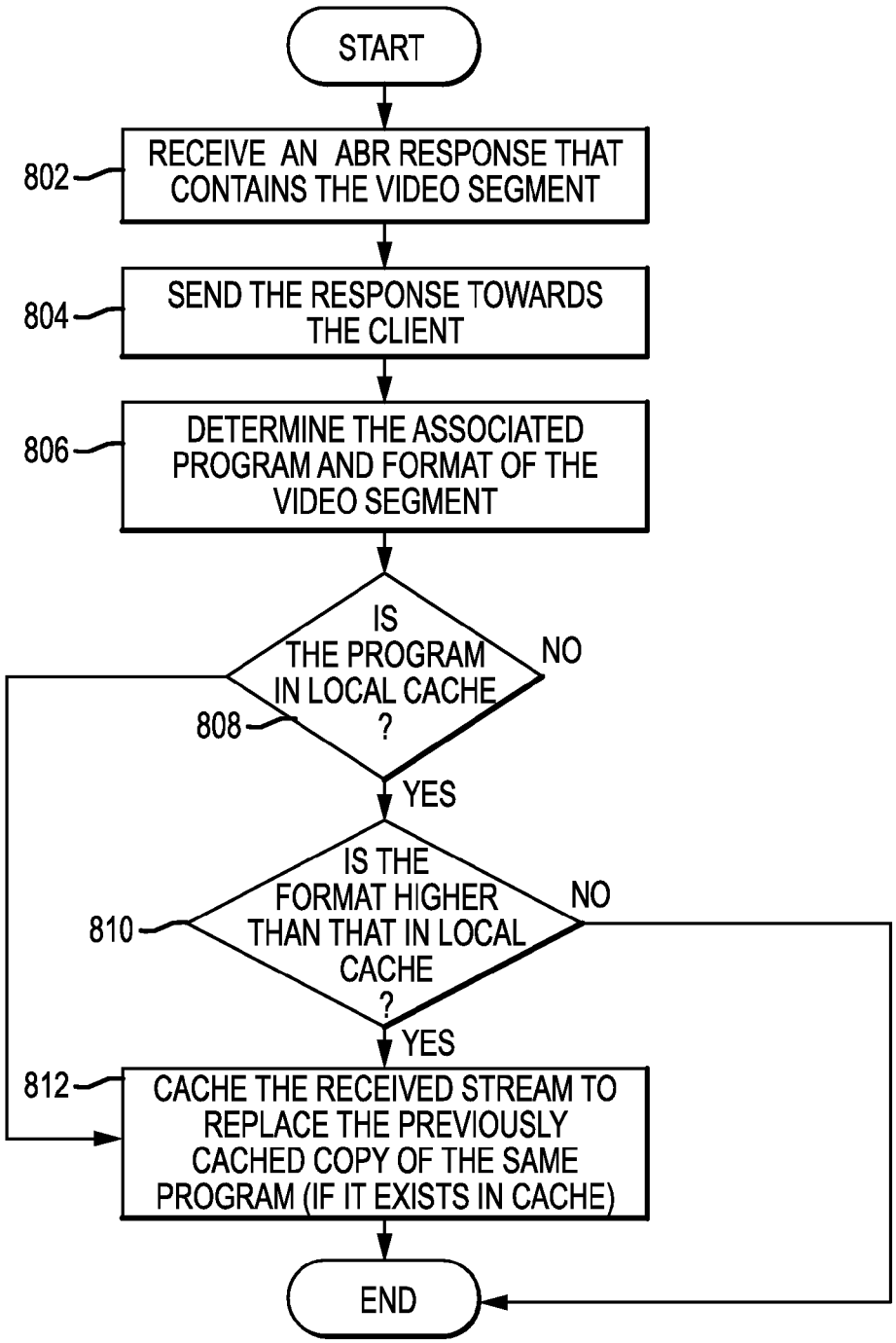
FIG. 8 illustrates a flow diagram of an example process of a layered local cache transcoding system for adaptive bit rate services in accordance with one or more implementations.

FIG. 8 illustrates a flow diagram of an example process 800 of a layered local cache transcoding system for adaptive bit rate services in accordance with one or more implementations. For explanatory purposes, the blocks of the example process 700 are described herein as occurring in serial, or linearly. However, multiple blocks of the example process 700 may occur in parallel. In addition, the blocks of the example process 700 need not be performed in the order shown and/or one or more of the blocks of the example process 700 need not be performed.

Upon receiving an ABR response from the WAN-facing interface (e.g., CMC PON interface 502, GW cable interface 602) (802), the ABR classifier (e.g., CMC ABR classifier 504, GW ABR classifier 604) forwards the response towards the downstream client (804). The ABR classifier determines the associated program and the video definition format of the video segment (806). At the same time, the ABR classifier may determine whether the received video stream is associated with a locally cached program (808). If no, the response is also forwarded to the ABR cache interface (e.g., CMC ABR cache interface 510, GW ABR cache interface 610) for local caching.

If the received video stream is associated with a locally cached program, the ABR classifier determines whether the response has a video definition format that is higher than a stream of the same program that has already been cached locally (810). If no, the response is not forwarded to the ABR cache interface.

If the response has a video definition format that is higher than a stream of the same program that has already been cached locally, the response is forwarded to the ABR cache interface. The ABR cache interface then controls the local cache (e.g., CMC ABR cache 512, GW ABR cache 612) to store the newly received stream, replacing the previous stream of the same program of lower profile (812). This ensures that the local cache keeps the program copy that has the highest profile.

The above algorithms can be refined to take into consideration of the available cache storage space, the priority and importance of the programs, as well as the available bandwidth. For example, when the local storage is becoming constrained, a requested program that has a higher profile (e.g., locally cached version has a lower video definition format) than a local copy can be transcoded from the local copy without requiring the local copy to be replaced by the higher profile copy (that is streamed from the higher-level cache or the central ABR server 412).

In some aspects, the above decision about generating a higher-profile copy from the local lower-profile copy can be qualified by the priority and importance of the program. If the program is important, this generation is not performed; otherwise, the copying operation is performed (the priority level is less than an importance threshold).

In some implementations, the above decision about generating a higher-profile copy from the local lower-profile copy can be qualified by the available bandwidth of the channels on the both sides (e.g., WAN-facing and LAN-facing) of the caching device (e.g., CMC's 404, GW's 408). If the bandwidth is becoming constrained based on knowledge of the caching device, the generating of the higher-profile copy is performed (e.g., the bandwidth is less than a bandwidth threshold); otherwise, the copying operation is not performed.

The examples processes 700 and 800 may apply to both the CMC's 404 and the GW's 408, and the example processes 700 and 800 can allow the requested lower-format video streams to be generated via transcoding an existing video stream of the higher video definition format, and also ensure the local cache keeps the highest-profile copy of any requested program.

Figure 9:
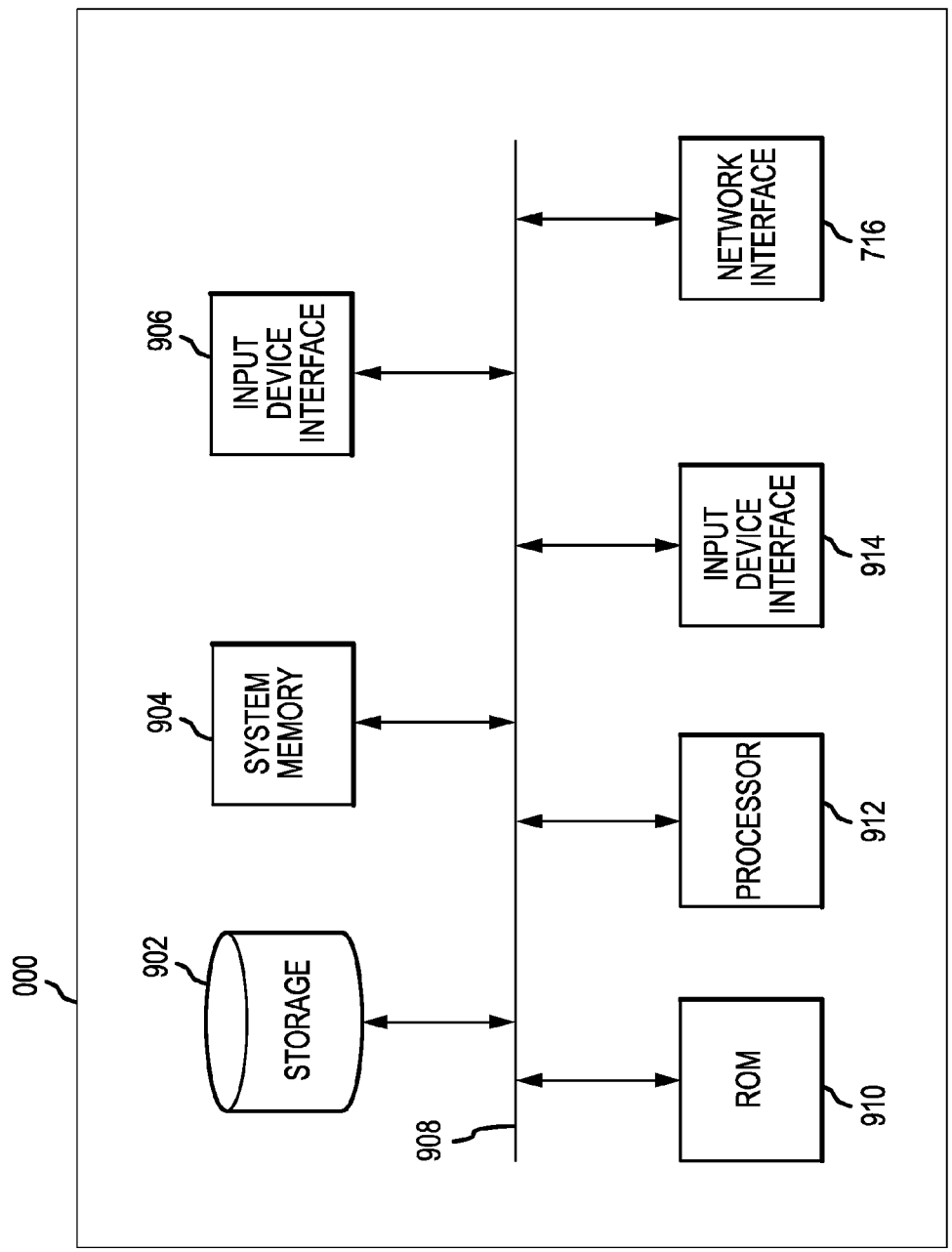
FIG. 9 conceptually illustrates an electronic system with which one or more implementations of the subject technology may be implemented.

FIG. 9 conceptually illustrates an electronic system 900 with which one or more implementations of the subject technology may be implemented. The electronic system 900, for example, can be a desktop computer, a laptop computer, a tablet computer, a server, a switch, a router, a base station, a receiver, a phone, a personal digital assistant (PDA), or generally any electronic device that transmits signals over a network. The electronic system 900 can be, and/or can be a part of, the ABR server 212, one or more of the media converter devices 206, one or more of the gateway devices 210, and/or one or more of the user devices 218. Such an electronic system 900 includes various types of computer readable media and interfaces for various other types of computer readable media. The electronic system 900 includes a bus 908, one or more processing unit(s) 912, a system memory 904, a read-only memory (ROM) 910, a permanent storage device 902, an input device interface 914, an output device interface 906, a local area network (LAN) interface 916, and a wide area network (WAN) interface 918, or subsets and variations thereof.

The bus 908 collectively represents all system, peripheral, and chipset buses that communicatively connect the numerous internal devices of the electronic system 900. In one or more implementations, the bus 908 communicatively connects the one or more processing unit(s) 912 with the ROM 910, the system memory 904, and the permanent storage device 902. From these various memory units, the one or more processing unit(s) 912 retrieves instructions to execute and data to process in order to execute the processes of the subject disclosure. The one or more processing unit(s) 912 can be a single processor or a multi-core processor in different implementations.

The ROM 910 stores static data and instructions that are needed by the one or more processing unit(s) 912 and other modules of the electronic system 900. The permanent storage device 902, on the other hand, may be a read-and-write memory device. The permanent storage device 902 may be a non-volatile memory unit that stores instructions and data even when the electronic system 900 is off. In one or more implementations, a mass-storage device (such as a magnetic or optical disk and its corresponding disk drive) may be used as the permanent storage device 902.

In one or more implementations, a removable storage device (such as a floppy disk, flash drive, and its corresponding disk drive) may be used as the permanent storage device 902. Like the permanent storage device 902, the system memory 904 may be a read-and-write memory device. However, unlike the permanent storage device 902, the system memory 904 may be a volatile read-and-write memory, such as random access memory. The system memory 904 may store any of the instructions and data that one or more processing unit(s) 912 may need at runtime. In one or more implementations, the processes of the subject disclosure are stored in the system memory 904, the permanent storage device 902, and/or the ROM 910. From these various memory units, the one or more processing unit(s) 912 retrieves instructions to execute and data to process in order to execute the processes of one or more implementations.

The bus 908 also connects to the input and output device interfaces 914 and 906. The input device interface 914 enables a user to communicate information and select commands to the electronic system 900. Input devices that may be used with the input device interface 914 may include, for example, alphanumeric keyboards and pointing devices (also called "cursor control devices"). The output device interface 906 may enable, for example, the display of images generated by electronic system 900. Output devices that may be used with the output device interface 906 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 9, the bus 908 also couples the electronic system 900 to a network (not shown) through the LAN interface 916 and separately, or jointly, through the WAN interface 918. In this manner, the electronic system 900 can be a part of a network of computers, such as a LAN through the LAN interface 916, a WAN through the WAN interface 918, an Intranet through either of the interfaces 916, 918, or a network of networks through either of the interfaces 916, 918, such as the Internet. Any or all components of the electronic system 900 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In some implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as application specific integrated circuits (ASICs) or field programmable gate arrays (FPGAs). In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

A phrase such as "an aspect" does not imply that such aspect is essential to the subject technology or that such aspect applies to all configurations of the subject technology. A disclosure relating to an aspect may apply to all configurations, or one or more configurations. An aspect may provide one or more examples of the disclosure. A phrase such as an "aspect" may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples of the disclosure. A phrase such an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples of the disclosure. A phrase such as a "configuration" may refer to one or more configurations and vice versa.

The word "exemplary" is used herein to mean "serving as an example, instance, or illustration." Any embodiment described herein as "exemplary" or as an "example" is not necessarily to be construed as preferred or advantageous over other embodiments. Furthermore, to the extent that the term "include," "have," or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A system for transcoding locally cached content, comprising:
   a local cache configured to store at least a video stream;
   a controller communicatively coupled to the local cache and configured to determine a video definition format of a requested version of a requested video stream and compare the video definition format of the requested version of the requested video stream with a video definition format of a cached version of the requested video stream; and
   a transcoder circuit coupled to the controller, the transcoder circuit configured to convert the cached version of the requested video stream to a lower video definition format if the video definition format of the cached version is determined to be of a higher video definition format than the video definition format of the requested version,
   wherein if the video definition format of the requested version is of a same video definition format as the video definition format of the cached version, the controller is configured to supply the requested video stream using the cached version stored in the local cache without transcoding.

2. The system of claim 1, further comprising:
a first network interface coupled to a first distribution network, the first network interface configured to receive packets transmitted on a downstream channel via the first distribution network from a network node located upstream;
a second network interface coupled to a second distribution network, the second network interface configured to receive packets transmitted on an upstream channel via the second distribution network;
a core circuit coupled to the second network interface configured to forward cached packets to the second network interface;
a packet classifier circuit configured to inspect one or more video packets to determine whether the one or more video packets need to be stored in the local cache; and
a cache interface circuit coupled to the packet classifier circuit, the cache interface circuit configured to control the local cache based on caching policies.

3. The system of claim 2, wherein the packet classifier circuit, in downstream operation, is configured to:
forward one or more packets to the cache interface circuit for storage in the local cache if the packet classifier circuit determines that the one or more packets are transmitted from the network node located upstream in response to a request from a user device located downstream;
forward the one or more packets to the core circuit if the packet classifier circuit determines that the one or more packets are not in response to a previous request but are destined for the system; and
discard the one or more packets if the packet classifier circuit determines that the one or more packets are not in response to the previous request and are destined for another network node on the first distribution network.

4. The system of claim 3, wherein the cache interface circuit is configured to:
receive the one or more packets from the packet classifier circuit;
convert the received packets into formatted packets having a client format; and
forward the formatted packets to the user device located downstream via the second network interface.

5. The system of claim 2, wherein the packet classifier circuit, in upstream operation, is configured to:
forward one or more packets to the cache interface circuit if the packet classifier circuit determines that the one or more packets comprise requests for video packets stored in the local cache; and
forward the one or more packets to the first network interface if the packet classifier circuit determines that the one or more packets comprise requests for video packets not stored in the local cache.

6. The system of claim 5, wherein the cache interface circuit is configured to:
receive, from the packet classifier circuit, the one or more packets that comprise requests for video packets stored in the local cache;
retrieve the requested video packets from the local cache;
generate one or more responses comprising the retrieved video packets; and
forward the generated responses to the core circuit.

7. The system of claim 2, wherein the transcoder circuit comprises:
a transcoder interface communicatively coupled to the cache interface circuit; and
a plurality of transcoders coupled to the transcoder interface, each of the plurality of transcoders configured to convert the cached version of the requested video stream into a transcoded video stream having a respective video definition format.

8. The system of claim 2, wherein the system is one of a plurality of network nodes arranged in a hierarchical tree network arrangement with a central caching controller being upstream from the system and a plurality of user devices being downstream from the system.

9. The system of claim 8, wherein each of the plurality of network nodes is one of a first type or a second type of network node, wherein each network node of the first type is upstream from each network node of the second type.

10. The system of claim 9, wherein the system is of the first type on the first distribution network, wherein the central caching controller is configured to control a transcoding behavior of the system.

11. The system of claim 9, wherein the system is of the second type on the second distribution network, wherein each network node of the first type is configured to control a transcoding behavior of the system.

12. A computer program product comprising instructions stored in a non-transitory tangible computer-readable storage medium, the instructions, when executed on a device, cause the device to:
facilitate receipt of a request for a requested version of an adaptive bit rate (ABR) video content from a downstream client;
determine if a version of the requested ABR video content is stored in a local cache;
determine if a video definition format of the requested version of the requested ABR video content is of a higher video definition format than a video definition format of a local version of the requested ABR video content determined to be stored in the local cache;
transcode the local version to a lower video definition format if the video definition format of the requested version is determined to be lower than the video definition format of the local version; and
facilitate transmission of the local version to the downstream client in response to the request.

13. The computer program product of claim 12, wherein the instructions, when executed on the device, cause the device to facilitate forwarding of the request to a higher-level cache or a central ABR server located upstream if the video definition format of the requested version is of the higher video definition format than the video definition format of the local version of the requested ABR video content.

14. The computer program product of claim 13, wherein the request is not forwarded to the higher-level cache or the central ABR server if the higher-level cache or the central ABR server has local storage space that is constrained, and wherein the instructions, when executed on the device, cause the device to generate a response to the request using the local version of the requested ABR video content.

15. The computer program product of claim 13, wherein the request is not forwarded to the higher-level cache or the central ABR server if channel bandwidth to the higher-level cache or the central ABR server is less than a bandwidth threshold, and wherein the instructions, when executed on the device, cause the device to generate a response to the request using the local version of the requested ABR video content.

16. The computer program product of claim 13, wherein the request is not forwarded to the higher-level cache or the central ABR server if the requested ABR video content has a priority level that is less than an importance threshold, and wherein the instructions, when executed on the device, cause the device to generate a response to the request using the local version of the requested ABR video content.

17. The computer program product of claim 12, wherein the instructions, when executed on the device, cause the device to generate a response to the request using the local version if the video definition format of the requested version is of a same video definition format as the video definition format of the local version.

18. The computer program product of claim 12, wherein the instructions, when executed on the device, cause the device to facilitate forwarding of the request to a higher-level cache or a central ABR server located upstream if no version of the requested ABR video content is determined to be stored in the local cache.

19. A computer-implemented method comprising:
facilitating receipt of a response from an upstream network node, the response comprising a requested version of a previously requested video content;
facilitating forwarding of the response to a downstream client;
determining if a local version the previously requested video content is stored in a local cache;
determining if a video definition format of the requested version of the previously requested video content is of a higher video definition format than a video definition format of the local version of the previously requested video content determined to be stored in the local cache; and
storing the requested version of the previously requested video content in the local cache to replace the local version if the video definition format of the requested version is determined to be of the higher video definition format than the video definition format of the local version.

20. The computer-implemented method of claim 19, further comprising facilitating forwarding of the requested version of the previously requested video content to a cache interface communicatively coupled to the local cache if the requested version has a video definition format that is of the higher video definition format than the video definition format of the local version.

* * * * *